United States Patent [19]
Kay et al.

[11] Patent Number: 4,604,445
[45] Date of Patent: Aug. 5, 1986

[54] POLYURETHANE PREPOLYMER COMPRISING THE REACTION PRODUCT OF AT LEAST TWO ACTIVE HYDROGEN CONTAINING SUBSTANCES WITH POLYISOCYANATE

[75] Inventors: Edward L. Kay, Akron; Kenneth B. Roskos, Clinton, both of Ohio

[73] Assignee: The Firestone Tire & Rubber Co., Akron, Ohio

[21] Appl. No.: 724,693

[22] Filed: Apr. 18, 1985

[51] Int. Cl.$^4$ ............................................. C08G 18/12
[52] U.S. Cl. ...................................... 528/64; 528/65; 528/76; 528/77; 528/78; 528/79
[58] Field of Search ................... 528/64, 65, 76, 77, 528/78, 79

[56] References Cited

U.S. PATENT DOCUMENTS

| 4,110,317 | 8/1978 | Moraveck | 528/77 |
| 4,145,515 | 3/1979 | Pogozelski et al. | 528/77 |
| 4,485,719 | 12/1984 | Mendelsohn et al. | 528/77 |
| 4,532,316 | 7/1985 | Henn | 528/77 |

Primary Examiner—Maurice J. Welsh
Attorney, Agent, or Firm—Daniel N. Hall

[57] ABSTRACT

A process and urethane composition for making urethane prepolymers from a polyisocyanate and blends of two or more urethane intermediates. The prepolymers so produced when cured have improved physical properties such as high low strain modulus and tensile strength relative to cured polyurethanes prepared from a mixture of prepolymers prepared by reacting a polyisocyanate with the component intermediates and subsequently blending the prepolymers.

18 Claims, No Drawings

POLYURETHANE PREPOLYMER COMPRISING THE REACTION PRODUCT OF AT LEAST TWO ACTIVE HYDROGEN CONTAINING SUBSTANCES WITH POLYISOCYANATE

TECHNICAL FIELD

The present invention relates to a process and product thereof for preparing urethane prepolymers. More specifically, the present invention relates to the preparation of urethane prepolymers from blends of urethane intermediates which differ in chemical composition via reaction of the urethane intermediate blends with generally an excess of polyisocyanate.

BACKGROUND

It is generally known that urethane prepolymers can be prepared by reaction of a polyisocyanate with an intermediate. The intermediate is a relatively high molecular weight compound and is usually terminated with hydroxyl functions. The polyisocyanate is usually a diisocyanate. Thus the reaction of the polyisocyanate with the intermediate polyol produces a urethane prepolymer with functional groups on each end of the prepolymer. If a diisocyanate is reacted with a diol in a molar ratio of one isocyanate to one hydroxyl function, theoretically a single polymer molecule would be formed having an isocyanate function on one end and a hydroxyl function on the other end. Under practical conditions, a single prepolymer molecule does not form because of various side reactions. The product is generally a very viscous fluid or solid which is difficult to handle and, therefore, of little practical utility. For this reason, urethane prepolymers are generally formed by reacting a polyol with an excess of polyisocyanate so that each prepolymer molecule is terminated with an isocyanate function. Generally, the molar ratio of isocyanate to hydroxyl is at least 2:1 so that a single diol will react with two diisocyanate molecules to form a prepolymer composed of a single diol molecule with a molecule of the diisocyanate reacted on each end. This prepolymer is then chain extended, usually with a low molecular weight diol and usually using a hydroxyl isocyanate molar ratio of 1:1, to form a polyurethane of high molecular weight which can be molded or cast into useful products.

In the field of our invention, a large excess of polyisocyanate is used so that the "hard segments" which are the urethane functions formed by the reaction of the prepolymer isocyanate functions as well as the excess diisocyanate with the chain extender (usually a low molecular weight diol) can be increased to the order of 25% to 50% by weight of the final polyurethane.

The preparation of prepolymers from diisocyanates and diols having the same repeating unit but different molecular weights and the preparation of prepolymers having different repeating units but essentially the same or different molecular weights can be prepared in a manner as set forth above.

According to the present invention, prepolymers are prepared by blending at least two different intermediates and subsequently reacting the blend with a polyisocyanate. Although one skilled in the art would expect that similar prepolymers are formed, it has been unexpectedly determined that the method of the present invention produces a urethane prepolymer which, when chain extended, produces a polyurethane with physical properties generally superior to polyurethanes prepared by the prior art method.

SUMMARY OF THE INVENTION

Urethane prepolymers are produced according to the present invention wherein urethane intermediates are blended before reaction with a polyisocyanate. The process requires less energy input than producing urethane prepolymer by alternative processes and also results in urethane prepolymers which, after curing, have improved physical properties compared to alternative processes.

In general, the urethane composition comprises the reaction product of a polyisocyanate and an effective amount of at least two urethane intermediates, said polyisocyanate having the formula R(N=C=O)n where R is an aliphatic having from 2 to 20 carbon atoms, a cycloaliphatic having from 4 to 20 carbon atoms, an aromatic or aliphatic substituted aromatic having from 6 to about 20 carbon atoms, or combinations thereof and wherein said intermediate has two or more end groups selected from the group consisting of hydroxyl, amine, or combinations thereof.

PREFERRED EMBODIMENTS

Blends of two or more urethane intermediates or low molecular weight polymers are produced by mixing the intermediates. The urethane intermediate is a low molecular weight polymer having an average molecular weight of from about 100 to about 10,000 and desirably from about 200 to about 8000. The intermediate polymers contain hydroxyl and/or amine end groups and are characterized by two or more hydroxyl and/or amine groups with regard to each individual polymer molecule. Desirably, the hydroxyl and/or amine functions are limited to two per molecule. A desirable low molecular weight urethane intermediate is a polyether such as a polyether having a repeating unit (—O—R—) wherein R is from 2 to about 10 carbon atoms and preferably from about 2 to about 6 carbon atoms. R can be aliphatic, aromatic or combinations thereof. An alkyl group is preferred. Specific examples of suitable polyether type urethane intermediates include poly(oxyethylene)diol, poly(oxypropylene)diol, poly(oxybutylene)diol, as well as their respective triols. Generally, a minimum amount of 1.0% by weight, at least 5.0% and desirably at least 8% of any individual urethane intermediate is used in the blend based upon the weight of all of various urethane intermediates utilized.

The blend of the urethane intermediates is then reacted with a polyisocyanate to form the prepolymer. Suitable polyisocyanates include those having the formula R—(N=C=O)$_n$, where R can be an aliphatic containing from about 2 to about 20 carbon atoms, a cycloaliphatic containing from 4 to about 20 carbon atoms, an aromatic containing from 6 to about 20 carbon atoms, or combinations thereof, as for example, alkyl-substituted aromatics. Desirably R is an aromatic or an alkyl substituted aromatic group having from 6 to 14 carbon atoms. The number of isocyanate units, that is "n" is an integer such as 2, 3 or higher with 2 being highly preferred. Examples of polyisocyanates include the following as well as isomers thereof; diphenyl diisocyanates; 2,4,4'-triisocyanate diphenyl ether; triphenylmethane triisocyanate; benzene-1,2,4-triisocyanate; naphthalene-1,3,7-triisocyanate and the like. Highly preferred polyisocyanates include meta or para-phenylene diisocyanate; diphenylmethane diisocyanates; bitolylene diisocyanates; dianisidine diisocyanates; isophorone diisocyanates; toluene diisocyanates; hexamethylene diisocyanate; pentamethylene diisocyanate; and MDI; that is 4,4′-diphenylmethane diisocyanate which is one of the highly preferred diphenylmethane diisocyanates.

Inasmuch as the polyisocyanate is preferably a diisocyanate, it will so be referred to hereinafter with the understanding that, if desired, a polyisocyanate, that is wherein three or more isocyanate groups exist within the compound can be utilized. Generally, an excess amount of a diisocyanate is utilized in the prepolymer formation such that "free isocyanate" (NCO) exists. Optionally, an equivalent amount of the diisocyanate based upon the amount of hydroxyl or amine end groups can be utilized. An amount of diisocyanate is utilized such that from about 1.0 to about 20%, desirably from about 4.0 to about 16% and preferably from about 8% to about 12% free isocyanate (NCO) groups exist based upon the total weight of the prepolymer.

Specifically, the amount of diisocyanate added to the blend of urethane intermediates can be calculated as follows:

(1) Based on the hydroxyl (amine) number of the urethane intermediate, the number of moles of hydroxyl (amine) function is calculated.

(2) The moles of hydroxyl (amine) function were converted to weight of the diisocyanate in a ratio of [OH] or [amine]/diisocyanate.

(3) The weight of diisocyanate required to obtain a desired level of "free NCO" (the amount of NCO function that theoretically would not have reacted therein to prepolymer formation) was calculated.

(4) The weight of diisocyanate calculated in items (2) and (3) was the total amount of diisocyanate used in the prepolymer formation reaction.

Naturally, in calculating the amount of diisocyanate to be reacted with the urethane intermediates, the number of moles contributed by each type of urethane intermediate is used to calculate the amount of diisocyanate to be utilized.

The formation of the prepolymer may be effected by adding the blend of the intermediates to the diisocyanate, by adding the diisocyanate to the blend of the intermediates or, alternatively, by adding both the blend of the intermediates and the diisocyanate simultaneously to a suitable reaction vessel. By using the first procedure, an excess of diisocyanate will always exist. Initially an excess of intermediate will exist using the second procedure; however, an excess of diisocyanate will eventually exist as all of the required amount of material is charged. The third procedure will generally result in an excess amount of diisocyanate being in the reacion vessel but the excess will be less than when the first procedure is used. The prepolymer reaction temperature is from about 25° C. to about 150° C. with from about 35° C. to about 140° C. being preferred.

Once the prepolymers have been made utilizing the blends of the urethane intermediates, chain extension and curing can be effected by adding the required amount of a chain extending curing agent thereto. The chain extending curing agents are usually highly polar compounds. Desirably they include low molecular weight polyols and/or amines having from about 2 to about 12 carbon atoms and preferably from about 4 to about 8 carbon atoms. Alkyl, aromatic or alkyl substituted aromatic polyol and/or amine compounds may be used to advantage. Examples of specific polyols include ethylene glycol, 1,3-propanediol, 2-methyl-1,3-propanediol, 1,4-butanediol, and the like. The various amine analogs of the above noted polyols can also be utilized such as alkyl amines as well as mixed amine/ols such as ethanol amine, 3-aminopropanol and the like. Aromatic amines such as o, m or p-phenylenediamine and aminophenols such as o-, m- or p-aminophenol and the like can also be used. The amount of the chain extending or curing agent used is such that the equivalent OH/NCO ratio is from about 0.80 to about 1.20, desirably from about 0.95 to about 1.05 and preferably about 1.0. The chain extending and curing reaction can be carried out in a conventional manner utilizing conventional temperatures and the like. Because the reaction of a hydroxyl function with an isocyanate function is exothermic, the addition of either the blend of diols of the diisocyanate or the diisocyanate to the blend of diols or the simultaneous addition of diol/diisocyanate may be carried out at a rate to maintain a desired reaction temperature. The completion of the reaction will of course be a function of time and temperature. Typically, the reaction of the chain extending temperature is from about ambient up to the boiling point of the chain extending curing agent such as about 180° C. with a temperature of from about 30° C. to about 100° C. being preferred. Curing generally occurs at a slightly higher temperature as from about 100° C. to about 200° C. and preferably from about 130° C. to about 160° C.

The invention will be better understood by reference to the following examples.

EXAMPLES A THROUGH H

The polyurethane prepolymers were prepared from commercially availabe products which are set forth in Table I.

TABLE I

Identification of Polyols and Reagents

Voranol 5148, a product of Dow Chemical identified as a poly(oxypropylene)triol having approximately 20% poly(oxyethylene)glycol endblock; 7000 nominal molecular weight.

Carbowax 400, a product of Union Carbide identified as a poly(oxyethylene)glycol; 400 nominal molecular weight.

Carbowax 1000, a product of Union Carbide identified as a poly(oxyethylene)glycol; 1000 nominal molecular weight.

MDI; 4,4′-diphenylmethane diisocyanate; a product of UpJohn Chemical.

BDO; butanediol-1,4; a product of DuPont Chemical.

General Experimental Procedure

The various urethane intermediates were added to a vessel and mixed. Then, a molten diisocyanate was added to the intermediates and heated under vacuum (less than 5 torr) for approximately 30 minutes at 100° to 110° C. The colorless prepolymer was then cooled and stored at 40° C. under nitrogen. The amount of MDI utilized to obtain a desired level of "free NCO" is as set forth above.

The chain-extension reaction was effected by adding the required amount of a chain extender, namely 1,4-butanediol, to the prepolymers at between 35° and 55° C., preferably at 40° C. After complete mixing of the reactants under vacuum (less than 5 torr) to degass the mixture, the reaction mixture was transferred to a 6"×6"×0.075" mold and cured at 140° C. for 30 minutes in a Wabash hydraulic press at 10 to 15 tons gauge pressure.

The stress/strain data reported in Tables II and III were determined on an Instron test machine using test procedures generally accepted in the rubber and plastic industries.

TABLE II

Comparison of Cured Polyurethanes
12% Free NCO; OH/NCO = 1.00; 30' Cure at 140° C.

| Composition | Prepolymers Prepared From Blend of Intermediates | | Blend of Preformed Prepolymers | |
|---|---|---|---|---|
| Sample | A | B | C | D |
| Voranol 5148 | 90 | 80 | 90 | 80 |
| Carbowax 400 | 10 | 20 | 10 | 20 |
| Properties at 25° C. | | | | |
| Shore A Hardness | 96 | 97 | 95 | 94 |
| Modulii at % Strain; psi | | | | |
| 5 | 980 | 880 | 650 | 520 |
| 50 | 1530 | 1852 | 1279 | 1276 |
| 100 | 1845 | 2332 | 1627 | 1830 |
| 200 | 2367 | 2959 | 2225 | 2715 |
| 300 | 2938 | 3537 | 2844 | — |
| Tensile, psi | 3615 | 4609 | 3321 | 2634 |
| % Elongation At Break | 396 | 421 | 367 | 196 |
| Properties at 100° C. | | | | |
| Modulii at % Strain; psi | | | | |
| 5 | 530 | 420 | 440 | 340 |
| 50 | 916 | 859 | 875 | 825 |
| 100 | 1085 | 1051 | 1085 | 1108 |
| 200 | 1327 | 1279 | 1438 | 1195 |
| 300 | — | 1558 | — | — |
| Tensile, psi | 1285 | 1500 | 1518 | 1099 |
| % Elongation At Break | 184 | 290 | 210 | 131 |

TABLE III

Comparison of Cured Polyurethanes
12% Free NCO; OH/NCO = 1.00; 30' Cure at 140° C.

| Composition | Prepolymers Prepared From Blend of Intermediates | | Blend of Preformed Prepolymers | |
|---|---|---|---|---|
| Sample | E | F | G | H |
| Voranol 5148 | 90 | 80 | 90 | 80 |
| Carbowax 1000 | 10 | 20 | 10 | 20 |
| Properties at 25° C. | | | | |
| Shore A Hardness | 95 | 95 | 94 | 94 |
| Modulii at % Strain; psi | | | | |
| 5 | 670 | 590 | 510 | 460 |
| 50 | 1416 | 1387 | 964 | 1070 |
| 100 | 1766 | 1843 | 1282 | 1490 |
| 200 | 2295 | 2422 | 1774 | 2064 |
| 300 | 2829 | 2952 | 2232 | — |
| Tensile, psi | 3936 | 3617 | 2245 | 2132 |
| % Elongation At Break | 453 | 403 | 303 | 211 |
| Properties at 100° C. | | | | |
| Modulii at % Strain; psi | | | | |
| 5 | 460 | 420 | 370 | 320 |
| 50 | 925 | 928 | 834 | 812 |
| 100 | 1130 | 1149 | 1058 | 1005 |
| 200 | 1398 | 1361 | — | — |
| 300 | — | — | — | — |
| Tensile, psi | 1530 | 1492 | 1252 | 987 |
| % Elongation At Break | 253 | 282 | 167 | 91 |

The data presented in Table II summarizes the physical properties of cured polyurethanes. Samples A and B were prepared by blending a poly(oxypropylene)triol endcapped with poly(oxyethylene)glycol, with a poly-(oxyethylene)glycol and subsequently preparing an MDI prepolymer of the intermediate blend with MDI at a 12.0% free NCO level. The prepolymers were chain-extended with BDO at a stoichiometry of OH/NCO=1.00 and cured 30 minutes at 140° C.

Cured polyurethane samples C and D were prepared by the direct blending of MDI prepolymers of a poly(oxypropylene)triol endcapped with poly(oxyethylene)glycol and an MDI prepolymer of a poly(oxyethylene)glycol of 400 molecular weight. Both prepolymers were prepared at a 12.0% free NCO level. The blends of prepolymers were also chain-extended with BDO at a stoichiometry of OH/NCO=1.00 and cured for 30 minutes at 140° C.

Comparing the physical properties of Samples A and C which are of the same overall material composition and differ only in the method of preparing the prepolymers, it is noted that, at 25° C., Sample A has a slightly higher Shore A hardness value of 96 as compared to 95 for Sample C. The modulii values as well as tensile value on Sample A are all greater than values determined on Sample C. The percent elongation value of 396 on Sample A is slightly higher than the 367 value on Sample C.

At 100° C., the low strain modulii of Sample A are greater than the respective values of Sample C. However, the 200% modulus as well a tensile value of Sample A is lower than observed on Sample C. The same is true of the percent elongations at break.

Referring to the physical properties of Samples B and D measured at 25° C. as well as 100° C., it should be noted that all of the values of Sample B are greater than the values observed on Sample D except the 100% modulus measured at 100° C.

Overall, the physical properties of cured polyurethanes prepared from a prepolymer synthesized via reaction of MDI with a blend of intermediates are generally superior to a polyurethane prepared from a blend of MDI prepolymers made from the same intermediates.

Interpretation of the test data in Table III which features a poly(oxyethylene)glycol of 1000 molecular weight also indicates that, overall, the physical properties of cured polyurethanes prepared from a prepolymer synthesized via reaction of MDI with a blend of intermediates are superior to a polyurethane prepared from a blend of MDI prepolymers prepared from the same intermediates, that is, a single intermediate.

It is thought that the improvement in stress/strain results observed in cured polyurethanes prepared from prepolymers which were prepared via reaction of MDI with a blend of intermediates as compared to a procedure of blending already prepared prepolymers is due to more even distribution of hard segments along the polyurethane polymer molecule. That is, a prepolymer of one type of an intermediate (referred to as the conventional process) will contain only said intermediate "endcapped" with an MDI unit as well as some additional repeating units of the same.

In contrast, the present "inventive" process utilizes a mixture of polyols to establish competitive reaction of two different intermediates with MDI which results in a more even or random distribution of hard segments in the polyurethane molecule.

The result may be depicted in simple form as follows where the MDI code represents a reacted MDI molecule and "A" and "B" represent reacted polyol molecules.

| | Prepolymer Composition |
|---|---|
| Conventional Process: | MDI-A-MDI some MDI-A-MDI-A-MDI<br>MDI-B-MDI some MDI-B-MDI-B-MDI |
| Inventive Process: | MDI-A-MDI some MDI-A-MDI-B-MDI<br>MDI-B-MDI some MDI-B-MDI-A-MDI |

Regardless of theory, the physical properties of the cured polyurethane obtained using a prepolymer prepared from a mixture of intermediates are superior to those properties obtained from cured polyurethanes prepared from a mixture of already formed prepolymers. In addition, the inventive process will require less energy input as a result of eliminating one prepolymer reaction which requires energy to effect as well as equipment utilization.

While in accordance with the patent statutes, a best mode and preferred embodiment has been set forth, the scope of the invention is not limited thereto, but rather by the scope of the attached claims.

What is claimed is:

1. A urethane prepolymer comprising:
   the reaction product of a polyisocyanate and an effective amount of at least two low molecular weight polymers each having two or more end groups selected from the group consisting of hydroxyl, amine, or combinations thereof, said polymers having a low molecular weight of from about 100 to about 10,000, said polyisocyanate having the formula $R(N=C=O)_n$ where R is an aliphatic having from 2 to 20 carbon atoms, a cycloaliphatic having from 4 to 20 carbon atoms, an aromatic or aliphatic substituted aromatic having from 6 to about 20 carbon atoms, or combinations thereof, the urethane prepolymer having an improved low strain modulus and an improved tensile strength upon cure.

2. A urethane prepolymer according to claim 1, wherein the amount of at least one of said low molecular weight polymers is at least 1.0% by weight based upon the total weight of said low molecular weight polymers.

3. A urethane prepolymer according to claim 2, wherein n of said polyisocyanate formulation is 2 and wherein said prepolymer contains from about 1% to about 20% free diisocyanate expressed as a weight percent [NCO] of the prepolymer.

4. A urethane prepolymer according to claim 1, wherein said low molecular weight polymer has an ether repeating group —(OR)— where R is an aliphatic, an aromatic, or combination thereof having from 2 to 10 carbon atoms.

5. A urethane prepolymer according to claim 4, wherein the amount of said free diisocyanate is from about 4% to about 16% by weight and wherein the amount of said at least one low molecular weight polymer is at least 5.0 wt. percent.

6. A urethane prepolymer according to claim 5, wherein the molecular weight of said prepolymer is from about 200 to about 8,000 and wherein said R of said polyether is an alkyl.

7. A urethane prepolymer according to claim 6, wherein said reaction product is cured with a chain-extending agent, said chain-extending agent being a polyol having from 2 to 12 carbon atoms, an amine analog thereof having from 2 to 12 carbon atoms, or an aromatic or aliphatic substituted aromatic amine having from 2 to 12 carbon atoms.

8. A urethane prepolymer according to claim 7, wherein the amunt of said at least one low molecular weight polymer is at least 8.0% by weight.

9. A process for making a blended preformed urethane prepolymer, comprising the steps of:
   adding at least two low molecular weight polymers to a vessel, each said low molecular weight polymer having a molecular weight of from about 100 to about 10,000, each said low molecular weight polymer having at least two end groups thereon selected from the group consisting of hydroxyl, amine, or combinations thereof,
   adding an effective amount of polyisocyanate to said vessel, said polyisocyanate having the formula $R(N=C=O)_n$ where R is an aliphatic having from 2 to 20 carbon atoms, a cycloaliphatic having from 4 to 20 carbon atoms, an aromatic or aliphatic substituted aromatic having from 6 to about 20 carbon atoms, or combinations thereof, and
   reacting said low molecular weight polymers and said polyisocyanate to form a urethane prepolymer, said urethane prepolymer having improved low strain modulus and improved tensile strength upon cure.

10. A process according to claim 9, wherein the amount of at least one of said low molecular weight polymers is at least 1.0% by weight based upon the total weight of said low molecular polymers.

11. A process according to claim 10, wherein n of said polyisocyanate is 2 and wherein said prepolymer contains from about 1% to about 20% free diisocyanate expressed as a weight percent [NCO] of the prepolymer.

12. A process according to claim 11, wherein said low molecular weight polymer has an ether repeating group —(OR)— where R is an aliphatic, an aromatic, or combination thereof having from 2 to 10 carbon atoms.

13. A process according to claim 12, wherein the molecular weight of said prepolymer is from about 200 to about 8,000 and wherein said R of said polyether is an alkyl.

14. A process according to claim 13, wherein the amount of said free diisocyanate is from about 4% to about 16% by weight and wherein the amount of said at least one low molecular weight polymer is at least 5.0 wt. percent.

15. A process according to claim 9, including curing said urethane prepolymer.

16. A process according to claim 11, including curing said urethane prepolymer.

17. A process according to claim 13, including chain extending and curing said prepolymer.

18. A process according to claim 14, including chain extending and curing said prepolymer.

* * * * *